ically, the product comprises an
3,476,613
PROCESS FOR PRODUCING α-ALUMINA WHISKERS Arno Gatti, Norristown, Pa., assignor to General Electric Company, a corporation of New York
No Drawing. Filed Sept. 13, 1966, Ser. No. 578,984
Int. Cl. B01j 17/20
U.S. Cl. 148—1.6      4 Claims

ABSTRACT OF THE DISCLOSURE

In an otherwise conventional α-alumina whisker growing process, iron is used as a catalyst to improve the quality and quantity of the whisker product.

---

This invention relates to an improved process for producing α-aluminum whiskers and more particularly to an apparent catalytic agent for such a process.

α-alumina whiskers are extremely strong micro-crystals having an α-alumina crystalline structure. Each individual whisker is a long, thin α-alumina crystal. Because of the high strength, and excellent high temperature stability of α-alumina, these whiskers are highly desirable as the reinforcing constituent of composite materials. However, known processes for producing α-alumina whiskers are time-consuming and inefficient in terms of the quantities of desired product and undesired by-product produced in these processes.

For example, it has been known for some time that α-alumina whiskers may be produced, in a vapor phase reaction, by reacting aluminum in a closed chamber containing an oxygen-containing refractory material, such as silica, at a temperature above 1300° C.

Generally, in processes of this type, an aluminum charge is placed in a refractory boat comprising pure alumina, silica, etc., and the boat is placed in the reaction chamber. After hydrogen or an inert gas has been introduced into the reaction chamber, the chamber and its contents are raised to a temperature above 1300° C. and held there until α-alumina whiskers have been formed. The quantity and quality of α-alumina produced in a process of this type is generally poor, however, and the rate of reaction is relatively slow.

It is therefore an object of the present invention to increase the rate of the α-alumina whisker-producing reaction.

It is also an object of the present invention to improve the α-alumina whisker-producing process by improving the quality of the product.

A further object of the present invention is to provide a means for reducing the amount of alumina debris, i.e. alumina in other than the crystalline whisker form, formed in an α-alumina whisker-producing process.

One other object of the present invention is to improve the yield, with respect both to quality and quantity of α-alumina whiskers, in an α-alumina whisker-producing process.

Briefly, in accordance with the present invention, these and other objects are met by the inclusion of a small, but significant, amount of elemental iron in the vapor phase reaction space of an α-alumina whisker-producing process of the type described above.

Claims particularly pointing out and distinctly claiming the subject matter of the present invention are subjoined to this specification. However, this invention may be better understood from the following detailed description of the invention.

While iron appears as an impurity in many of the materials used in the formation of α-alumina whiskers, it has not heretofore been considered to have a catalytic effect on the α-alumina whisker-producing reaction. It has now been found that elemental iron does have a definite favorable effect on this reaction. The precise nature of this effect is not known but several explanations may be offered. For example, iron may promote crystal growth at the tip of an α-alumina crystal or inhibit crystal growth along the sides thereof. Either way, there would be a tendency to form long, fine α-alumina crystals. Another possible explanation is that iron acts as a catalyst causing more nucleating events to occur. Since an increase in the number of nucleating events causes a greater distribution of available growth material, more whiskers are formed, the whiskers are more uniform in size and each whisker is less susceptible to overgrowths. These possible explanations have been neither proven nor disproven, however.

Looking then to the macroscopic observations which lead to the conclusion that elemental iron has a favorable effect on the α-alumina whisker-producing reaction, it is known that when α-alumina whiskers are produced by heating an aluminum charge in a refractory boat within a silica-containing tubular refractory reaction chamber to a temperature above 1300° C., the product is of generally poor quality and is variable with a random distribution of whisker shapes and sizes. These characteristics are evident from visual observations of the product. In these processes, there is either no iron present or it is present only as an impurity in the refractory materials.

When the same processes are conducted with a shield or structural element comprised of elemental iron placed near the aluminum charge, a substantially improved product results. Specifically, the product comprises an abundance of high quality α-alumina whiskers, having a high degree of consistency in both shape and size. This improved quality and quantity is also discernible by visual observations.

These results have been produced in apparatus generally comprising a three inch mullite tube as the reaction chamber, means for maintaining an atmosphere of hydrogen or inert gas in the chamber, means for heating the chamber to above 1300° C., and a boat in which is placed a charge of aluminum.

In some experiments, the elemental iron was included by using a boat made of iron. In other experiments, an alumina boat was used and an iron shield or barrier over the aluminum charge was added to the apparatus. For purposes of comparison, similar experiments were run with no iron present or with shields composed of materials other than elemental iron, e.g. alumina, tantalum and molybdenum. A product inferior in quantity and quality was produced in these experiments, as compared to that produced using the iron boat, shield, or barrier. This further confirmed the beneficial effect of elemental iron on the whisker-producing reaction.

While the present invention has been described, for purposes of clarity and convenience, with reference to particular embodiments thereof, it should be understood that numerous modifications may be made by those skilled in the art without departing from the invention's true spirit and scope. Therefore the appended claims are intended to cover all such equivalent variations as come within the true spirit and scope of the present invention.

What I claim as new and desire to secure by Letters Patent of the United States is:

1. In the process for producing α-alumina whiskers which includes heating aluminum and silica to above 1300° C. in an atmosphere of hydrogen or inert gas and holding siad aluminum and said silica at said elevated temperature until α-alumina whiskers have been formed, an improvement consisting of conducting said process in the presence of elemental iron.

2. In the process for producing α-alumina whiskers which includes heating a charge of aluminum in an alumina boat within a closed silica-containing refractory reaction chamber to a temperature above 1300° C. in an atmosphere of hydrogen or an inert gas and holding said reaction chamber containing said aluminum at said elevated temperature until α-alumina whiskers have been formed, an improvement consisting of placing in the vicinity of said aluminum, prior to closing and heating said chamber containing said aluminum, a quantity of elemental iron.

3. An improved process for producing α-alumina whiskers, as recited in claim 2, wherein said quantity of elemental iron is a solid piece of iron disposed above said aluminum charge.

4. The process for producing α-alumina whiskers which includes heating a charge of aluminum in an iron boat within a closed silica-containing refractory reaction chamber to a temperature above 1300° C. in an atmosphere of hydrogen or an inert gas and holding said reaction chamber containing said aluminum at elevated temperature until α-alumina whiskers have been formed.

References Cited

UNITED STATES PATENTS 3,023,115   2/1962   Wainer et al.

FOREIGN PATENTS 657,701   2/1963   Canada.
977,540   6/1964   France.
8,402   3/1965   France.
(Addition to No. 977,540)

OSCAR R. VERTIZ, Primary Examiner

H. S. MILLER, Assistant Examiner

U.S. Cl. X.R.

23—141